May 29, 1951     E. R. CROSSLEY     2,555,076
INSTRUMENT FOR USE IN PERFORMING
SURGICAL EYE OPERATIONS
Filed Nov. 17, 1947
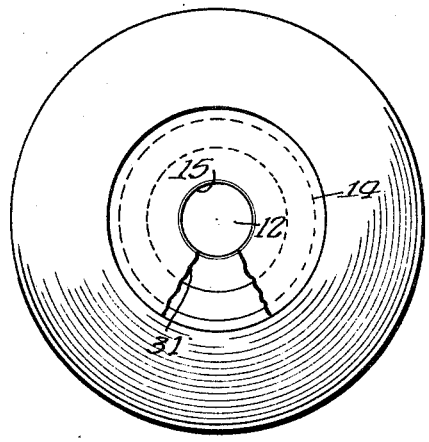
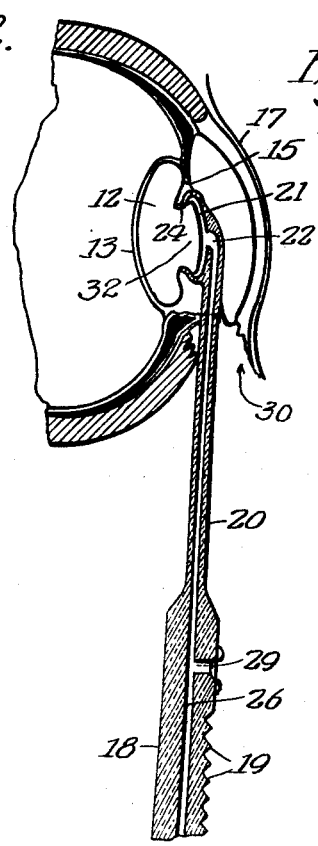
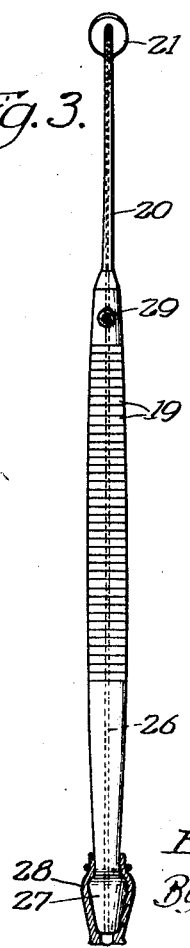
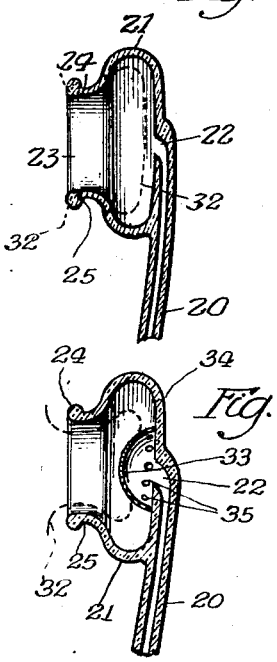
Inventor
Elijah R. Crossley Patented May 29, 1951

2,555,076

UNITED STATES PATENT OFFICE 2,555,076

INSTRUMENT FOR USE IN PERFORMING SURGICAL EYE OPERATIONS

Elijah R. Crossley, Chicago, Ill.

Application November 17, 1947, Serial No. 786,470

3 Claims. (Cl. 128—303)

This invention relates to surgical instruments in general, but more specifically the invention relates to an instrument for use in performing operations on the eye.

The treatment of certain pathological conditions of the eye, such as lenticular opacity, often requires the removal of the lens or cataract of the eye. The removal of the lens or cataract usually is accomplished by making an incision through the cornea at the junction of the cornea and the sclera, and then removing the lens through the pupillary space in the iris and the incision of the cornea.

Considerable difficulty has heretofore been encountered by reason of the fact that it is difficult, among other things, to take hold of and maintain a hold upon the lens during the operation of removing the lens.

An important object of the present invention is the provision of a novel and improved instrument for use in eye operations, the instrument including a vacuum cup, which is adapted to be inserted through an incision at the juncture of the cornea and sclera, and placed directly over the lens and in contact therewith so as to cause a portion of the lens to be drawn into the cup by vacuum to produce a bleb, whereby the cup will become firmly attached to the lens; there being improved means provided whereby the vacuum in the cup may be controlled, and the instrument including the cup, may be manipulated readily for disconnecting the lens and capsule from its attachment (the zonule of Zinn) of the eye, thus removing the entire opaque lens (or cataract) and the entire capsule from the eye in one operation.

Another important object of the invention is the provision of a new and novel surgical instrument for use in eye operations, the instrument having a vacuum cup provided with a restricted inlet, and an opening properly shaped and arranged so that a portion of the capsule and lens may be drawn thereinto, and that when so drawn, the cup and a portion of the lens will become so interlocked that it will be impossible to separate the cup and the attached portion of the lens during the operation unless the vacuum in the cup is released.

A further object is the provision of an improved instrument which is simple in construction, and effective and efficient in use.

Numerous other objects and advantages will be apparent throughout the progress of the specification which follows.

The accompanying drawings illustrate a selected embodiment of the invention, and the views therein are as follows:

Fig. 1 is a diagrammatic transverse sectional view of a portion of an eye showing the iris and the pupillary space, a portion of the iris being removed to produce a larger space for the lens to be removed and for prophylactic against subsequent complication;

Fig. 2 is a view showing a portion of the instrument constructed in accordance with the principles of this invention and connected to the eye lens;

Fig. 3 is an elevational view of the instrument embodying the present invention;

Fig. 4 is a detail sectional view, on an enlarged scale, of one form of vacuum cup; and Fig. 5 is a view similar to Fig. 4, of another form of vacuum cup.

Referring to the drawing, and particularly to Figs. 1 and 2 thereof, there is illustrated an eyeball which includes the lens 12, the posterior lens 13, anterior portion ciliary body terminating in the iris 14, the pupillary space 15 in the iris, the cornea 16, and the conjunctivia 17 of an eye.

The instrument forming the subject matter of the present invention may be of any proper size and configuration, and it may be constructed of any material suitable to perform the function intended. The instrument may be constructed to include a handle portion 18 having a series of transverse ribs or corrugations 19 provided on one or more surfaces, whereby it may be held when grasped between the fingers. A tubular member 20, of any suitable proper length and diameter projects from one end of the handle 18; and a vacuum cup 21 is arranged at one end of the tubular member. The tubular member 20 has communication with the interior of the cup 21, at the diametric center thereof as indicated at 22, so as to cause a direct unbroken vacuum to be exerted substantially centrally of the cup 21. The cup 21 is provided with a restricted receiving opening 23 of a diameter considerably less than the cross sectional diameter of the body portion of the cup, and this receiving opening 23 may be formed in any desired or suitable manner, preferably by means of an annular ring member 24 suitably shaped and secured about the opening 23 of the cup 21, as indicated at 25, Fig. 4.

The handle 18 of the instrument is provided with a passage 26 therethrough, which communicates with the passage in the tubular extension 20; and the extremity of the handle 18 is shaped as indicated at 27, Fig. 3, to form a suitable attaching shoulder over which one end of a flexible tubular member 28 is secured. The flexible tubular member 28 has communication with a suitable vacuum producing means so that a vacuum may be created in the vacuum cup 21 when the inlet opening 23 thereof is made to contact the lens and capsule in the proper manner, there being a control opening 29 in the handle so as to control the vacuum to the cup by permitting the opening to remain open, or to cause the opening to be closed such as by placing a finger thereover.

The opening 29 extends through the handle 18 and communicates with the passage 26 therein, the opening 29 providing means for controlling the vacuum in and to the cup 21. The opening 29 may be surrounded with an elevated encircling bead or ring so as to provide a definite shut-off by pressing a finger thereover. When the instrument is in use, and the opening 29 is sealed or closed by the finger of the operator, the vacuum producing device will cause a vacuum to be produced in the cup 21, and when the finger is removed from the opening 29, the vacuum in the vacuum cup will be released.

To use this instrument in performing a surgical operation upon the eye for removing the lens, it is preferable to first make an incision through the cornea 16 as indicated at 30, Fig. 2, and then by means of tweezers, or other suitable instrument, inserted through the incision 30, a portion of the iris 14 is withdrawn therethrough, a portion of the iris being removed as indicated at 31 to produce a larger space or opening for the lens to be removed. The end of the instrument is then inserted through the incision 30 so as to position the restricted opening 23 of the cup 21 directly over, and in contact with, the lens 12. The vacuum producing device being in operation and the opening 29 being uncovered, no vacuum will be produced in the vacuum cup 21, even though the opening 23 is closed by the contact of the edge of the opening with the lens. When the vacuum cup has been properly positioned, the operator places a finger of the hand which holds the instrument, upon the opening 29, with the result that a vacuum will be immediately manifested in the vacuum cup 21. This vacuum will draw a portion of the lens 12 into the vacuum cup in the form of a bleb 32; the outer end of the bleb passing into the vacuum cup in substantially nail-head formation will cause the lens to adhere to the end of the instrument, because of the vacuum in the cup 21 and therefore the cup and lens will be interlocked firmly.

The inlet opening 22 is disposed substantially centrally of the vacuum cup 21 and causes the bleb 32 to be uniformly formed within the cup 21. When the instrument is in the position shown in Fig. 2, and the operator holds his finger over the opening 29, the two parts are locked together, and by the operator manipulating the instrument, may gradually cause the lens 12 to become detached from the ciliary bodies, thereby rendering it possible to withdraw the lens through the iris and the incision 30 in the cornea 16. So long as the opening 29 is maintained closed, all danger or possibility of the lens becoming detached from the vacuum cup 21 will be avoided.

The modified form of instrument shown in Fig. 5 may be identical with the instrument shown in Figs. 2, 3 and 4 but includes, in addition thereto, a hollow globular or semi-spherical part or body 33 which is secured to the inside face 34 of the cup 21. This hollow globular body is arranged concentrically with respect to the opening 22. A plurality of spaced holes 35 are arranged circumferentially about the body 33 so that the vacuum may be had through these holes within the cup 21 and centrally thereof. The instrument shown in Fig. 5, therefore, includes all the elements of the previously described device, but includes the body 33, the vacuum still being centrally of the cup 21. The body 33, however, is for the purpose of deflecting the lens and capsule laterally in all directions and prevents the capsule and lens from being pulled too far inwardly by the suction, a condition which may not be favorable under certain circumstances such as hyper-mature cataracts. The structure of Fig. 5, like the structure of Figs. 2 to 4, permits communication with the interior of the cup 21, the vacuum, interiorly of the cup, being through the small holes 35, Fig. 5, when the restricted opening 23 is in co-adaptation with an eye capsule and the interior surface of the eye lens.

The vacuum-forming device when in operation, and the opening 29 being closed by the forefinger of the operator, causes the capsule and lens substance to be immediately drawn into the vacuum cup. The center of the bleb 32 will be retarded, and not allowed to balloon up as high as in Fig. 4, but instead will be spread out to assume the formation, substantially as shown in dotted lines in Fig. 5. The capsule sometimes becomes fragile in hyper-mature cataracts and may break, therefore, the presence of the body 33 will prevent the bleb from ballooning and, at the same time, cause a true nailhead hold on the lens.

Changes may be made in the form, construction and arrangement of the parts without departing from the spirit of the invention or sacrificing any of its advantages, and the right is hereby reserved to make all such changes as fall fairly within the scope of the following claims.

The invention is hereby claimed as follows:

1. An instrument for performing surgical eye operations comprising a handle having a vacuum creating passage therethrough and adapted to be connected to a source of vacuum, a vacuum cup carried by one end of the handle and having an open front, said cup having a central opening in communication with said passage, means for controlling at will the said vacuum, and a hollow semi-spherical member extending outwardly from the inside face of the cup toward the open front, said member having a plurality of openings spaced about a part of the periphery thereof.

2. A surgical instrument for use in performing surgical eye operations comprising a handle member of a predetermined size and configuration, a thin tube projecting from one end of the handle member, a cup-like member at the end of the tube and having an opening into which a part of an eye may be received, there being a continuous passage through the handle and tube, said cup having a passage therein in communication with the first passage and terminating in an aperture located substantially centrally of the cup, remote from the opening, a centrally disposed reverse cup-like member over the aperture and bulging outwardly toward the opening in said cup, there being a plurality of openings formed in said latter cup-like member.

3. A surgical instrument for use in connection with surgical eye operations comprising a cup like member having an enclosed body with an open front and a base disposed rearwardly of the open front, the body increasing in size and terminating into a bulged side near the base and remote from the open front, said body having a passage therein terminating in an aperture positioned centrally of the cup at its base, a dome-like member bulging outwardly from the base toward the front and surrounding the aperture, said dome-like member having a plurality of openings therein.

ELIJAH R. CROSSLEY.

REFERENCES CITED

The following references are of record in the file of this patent:

UNITED STATES PATENTS

| Number | Name | Date |
|---|---|---|
| 1,615,494 | Waring | Jan. 25, 1927 |
| 1,931,740 | Ryan | Oct. 24, 1933 |
| 2,224,575 | Montalvo-Guenard | Dec. 10, 1940 |
| 2,293,171 | Reardon | Aug. 18, 1942 |

OTHER REFERENCES

General Catalog of V. Mueller & Co., Chicago, Illinois (1938), page 7, Instrument A14. (A copy is in Div. 55 of the Patent Office.)